Sept. 24, 1957  W. C. BUTCHER ET AL  2,807,176
AUTOMATIC DRILL FEED
Filed March 7, 1952  2 Sheets-Sheet 1
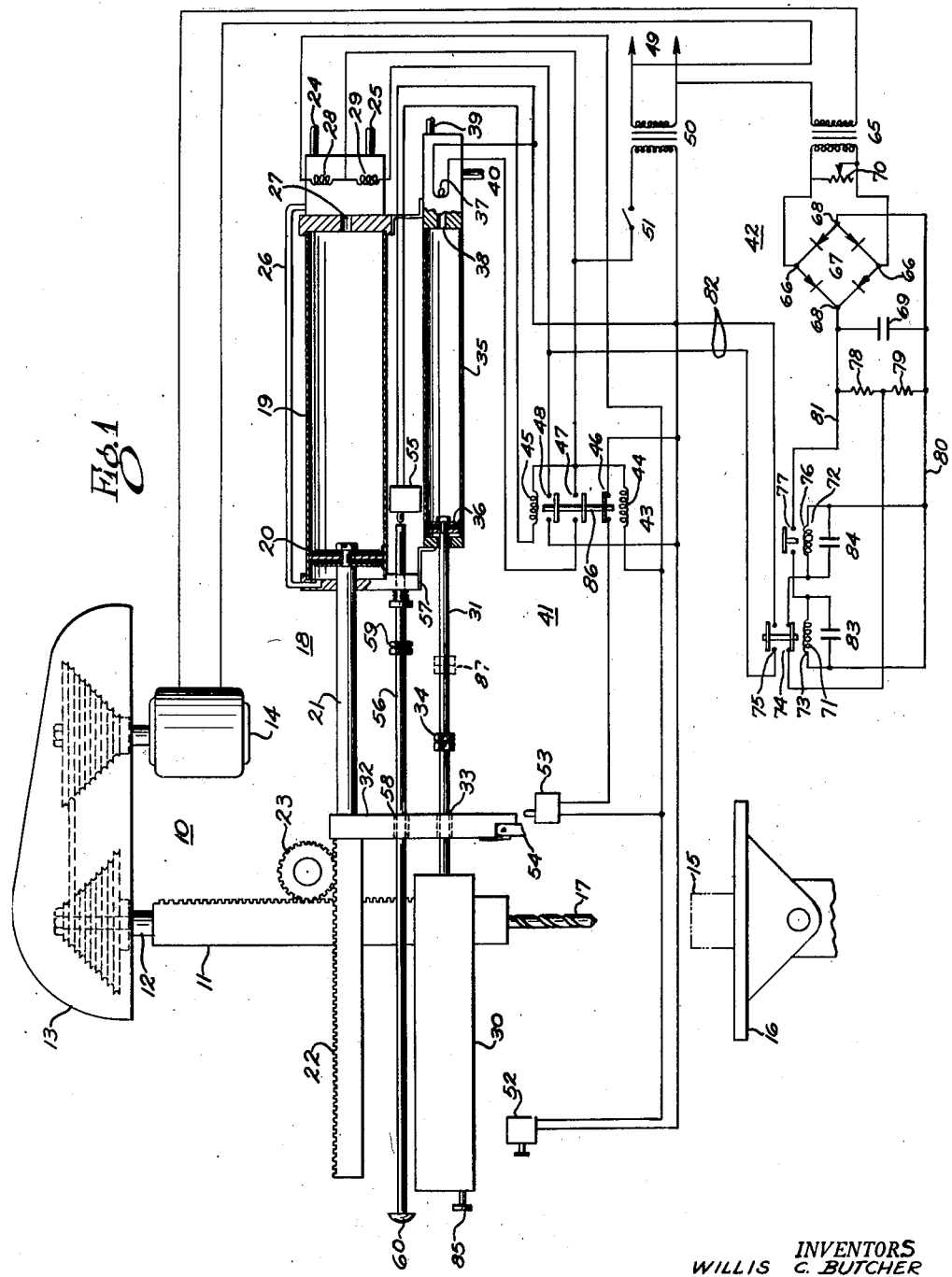
INVENTORS
WILLIS C. BUTCHER
& HERBERT B. LINK
BY
RICHEY, WATTS, EDGERTON & McNENNY
ATTORNEYS

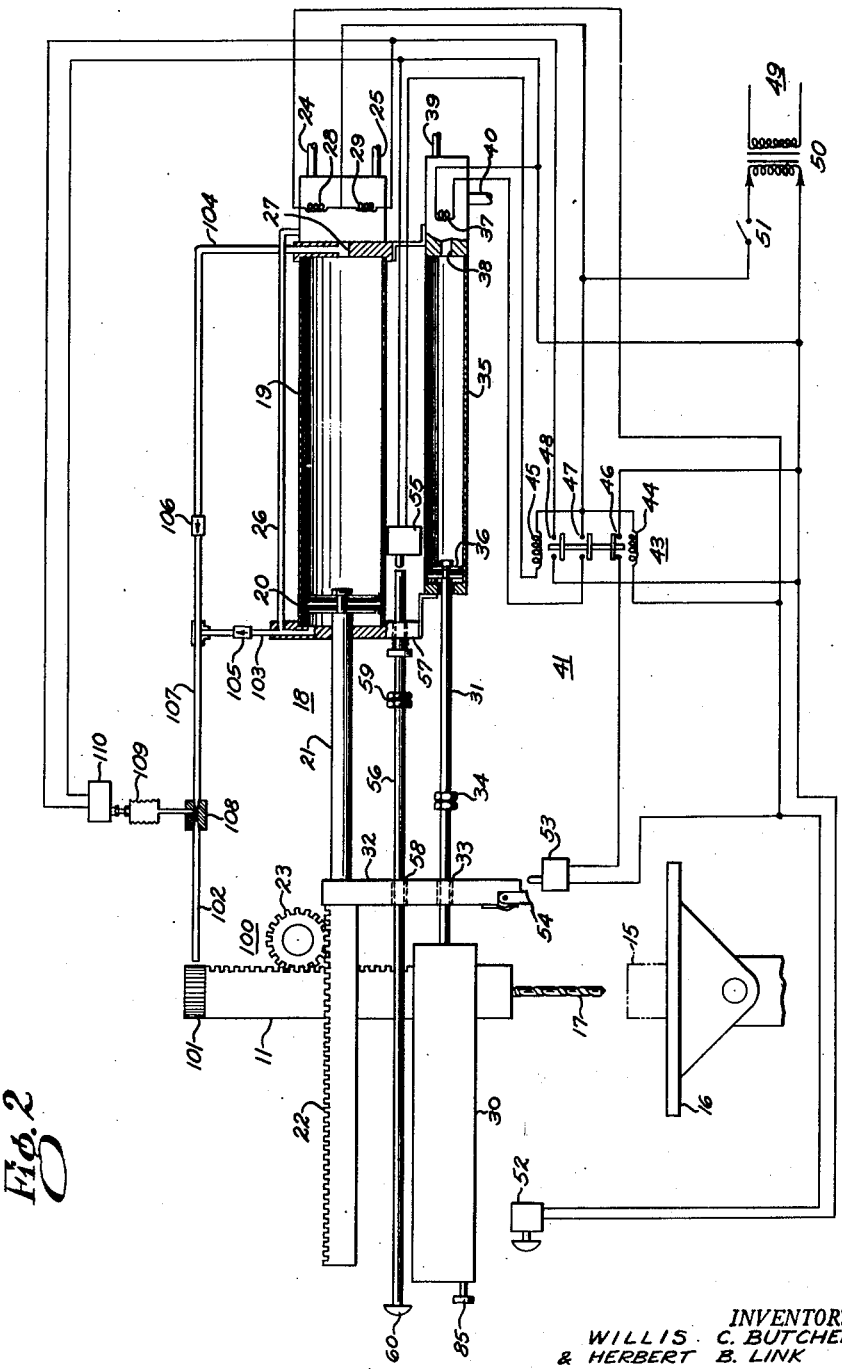

United States Patent Office 2,807,176
Patented Sept. 24, 1957

2,807,176

AUTOMATIC DRILL FEED

Willis C. Butcher, La Canada, Calif., and Herbert B. Link, Copley, Ohio, assignors to The Bellows Company, Akron, Ohio, a corporation of Ohio Application March 7, 1952, Serial No. 275,252

15 Claims. (Cl. 77—32.4)

This invention relates to the automatic control of machine tools and, more particularly, to a torque responsive device for controlling the feed mechanism of a drilling machine.

A primary object of the invention is the prevention of breakage of drills of drilling tools in drilling operations.

An object of the invention is the provision of a system for the control of advance and withdrawal of the feed mechanism of a machine tool in response to changes in drive torque.

An object of the invention is the provision of a system for the control of the feed mechanism of a machine tool in response to changes in drive torque and including position control of the rates of advance and withdrawal of the mechanism.

A further object of the invention is the provision of means for reducing drilling time in operations where repeated insertions and withdrawals of the drill are required.

In the operation of drill presses and similar machine tools, it is often required that the tool be withdrawn from the work during the drilling operations in order to clear the work and the tool. Such clearing operations remove shavings and burrs which tend to accumulate and cause binding of the tool with respect to the work, and would ultimately lead to breakage of the tool. Inasmuch as frequent repetition of the operation is normally necessary, there is an undue loss of production time.

The present invention is concerned with a control device for automatically withdrawing the tool of a machine tool from the work in response to an increase in load torque, such as might be caused by burrs or shavings, dullness of tool, or hard spots in the work and then reinserting the tool in the work to resume the drilling operation after the tool is cleared. The apparatus of the invention includes an actuator for reciprocating a machine tool spindle in an advance and retract cycle. A dashpot, associated with the actuator, serves to limit the rate of traverse of the spindle during the period when the tool is in working engagement with the work, the normal rate of traverse being substantially higher than this working or fee rate. The dashpot is connected to the actuator by a sliding link so that the dashpot constrains the actuator only during the feed portion of the travel of the actuator, while an ancillary actuator is directly connected to the dashpot for returning the dashpot to an initial operating position. The actuators are actuated by a source of fluid such as compressed air, and suitable controls in the form of solenoid actuated valves and electrical circuits are provided. Included particularly is a novel torque sensing circuit including a current transformer connected in series with the drive motor of the machine tool to be controlled. Suitable relays are connected with the secondary of the current transformer, the entire system being arranged so as to respond to slight changes in motor line current corresponding to an increase in load torque.

These and other objects, features and advantages will be apparent from a consideration of the following detailed specification and claims taken in connection with the appended drawings in which:

Fig. 1 is schematic representation of an illustrative embodiment of the invention; and Fig. 2 is a schematic representation of an alternate embodiment of the invention.

Referring now to Fig. 1, the invention is illustrated as embodied in apparatus for the feed control of a drill press. The drill press 10 comprises a spindle 11, a spindle shaft 12, a driving head 13 and a drive motor 14. A work piece 15 is supported by a bed 16 for working engagement by a drill tool 17 mounted in the spindle. 11. The drill press 10 is of known design; and, in operation, the drill 17 operates upon the work piece 15 by rotation about the longitudinal axis of the spindle 11 as imparted by the driving motor 14. The spindle 11 moves longitudinally along the spindle shaft 12 to bring the drill 17 into working engagement with the work piece 15. The spindle may, of course, remain fixed and the work bed be reciprocated relative to the drill within the spirit of the invention.

In accordance with the invention, there is associated with the drill press 10 a feed control apparatus 18 which functions to automatically control the feed of the press. The control function is such that the spindle 11 is advanced toward the work piece at a relatively rapid rate and until the drill 17 reaches a position of working engagement with the work piece. The drill 17 is then advanced into the work piece 15 at a working or feed rate until such time as the torque upon the drill increases beyond an arbitrary predetermined amount. The drill is then retracted from the work piece at the relatively rapid rate and the drill opening cleared of burrs, chips and the like. The cycle is then automatically repeated, the drilling operation continuing in each cycle until the overload condition is reached.

The reciprocation of the spindle 11 by the feed control 18 is accomplished by means of a pneumatic actuator comprising a cylinder 19 having a piston 20, and a rod member 21. A rack 22 at the outer end of the rod member 21 is geared to the spindle 11 by means of a pinion gear 23 so that a translation of the piston 20 produces a corresponding translation of the spindle 11. The pneumatic actuator referred to above is of a type known in the art.

The cylinder 19 is provided with an inlet 24 from a source of fluid under pressure such, for example, as in the present embodiment, of compressed air, and a suitable exhaust 25. Communication between either the inlet 24 and exhaust 25 and either end of the cylinder 19 is provided by means of conduits 26 and 27 and solenoid controlled valves, here represented schematically by the solenoid coils 28 and 29. The valve arrangement is such that energization of either solenoid by an appropriate electric current will connect the conduit associated with that solenoid with the inlet 24, while connecting the remaining conduit to the exhaust 25. The valve solenoids are of a design such that electrical impulses of relatively short duration serve to actuate the valve. As here shown, energization of the solenoid 28 opens the associated valve to admit compressed air to conduit 26, leading to the far end of the cylinder to retract the piston 20 and advance the spindle 11. Conversely, energization of solenoid 29 opens the associated valve to admit compressed air to conduit 27, leading to the near end of the cylinder to advance the piston 20 and retract the spindle 11.

The pneumatic actuator reciprocates the spindle 11 at a rate determined by the size of the piston, the air pressure and other known factors. A dashpot 30 is provided for controlling the rate of advance of the drill spindle 11 during the portion of the feed cycle in which the drill 17 is in working engagement with the work piece 15. To this end, a rod member 31 of the dashpot 30 is connected to the rod member 21 of the pneumatic actuation 19 by means of a transverse member 32 which is secured to the member 21. An opening 33 is provided in the transverse member 32 so that the member may slide freely along the rod member 31 until such time as the transverse member engages a stop nut 34 whereupon the rod 31 is constrained to move with the rod 21. Dashpot 30 is of a type known in the art, one form of which is shown in Fig. 1 of U. S. Patent No. 1,998,873.

The connection between the rod member 21 and the rod member 31 is unidirectional in action only, that is the rod 31 is constrained to move with rod 21 by the transverse member 32 only during the feed portion of the spindle advancing motion of the rod 21. Accordingly, a second or ancillary pneumatic actuator is provided to return the dashpot 30 to an initial operating position at the completion of an operation upon a work piece. The ancillary pneumatic actuator includes a cylinder 35 and a piston 36 which is connected to the rod member 31. The operation of the cylinder 35 is controlled by valve solenoid 37 which serves to connect a conduit 38 with either an inlet 39 or exhaust 40. Energization of the solenoid 37 by an appropriate electric current, therefore, serves to admit compressed air from the inlet 39 through the conduit 38 into the near end of the cylinder, and thus to drive the piston 36 and the rod member 31 to the initial operating position of the dashpot. It will be understood that the initial operating position here referred to is one in which the spindle 11 is withdrawn so that the drill 17 is not in working engagement with the work piece and the stop nut 34 is not constrained by the transverse member 32. The valve with which the solenoid 37 is associated normally connects the conduit 38 to the exhaust 40 and connects conduit 38 with inlet 39 only when the solenoid is energized.

The feed control 18 includes electric control circuits 41 for controlling the action of the solenoid valves 28, 29 and 37 so that, when properly initiated, the feed control system will automatically cycle the spindle 11 through the proper advance, feed, and retract cycle. A torque sensing means 42 comprises an electrical circuit for detecting changes in the line current of the drive motor 14 to initiate the action of the control circuit 41 upon the occurrence of an overload at the drill tool.

The control circuit 41 includes a latching relay 43 having a latch coil 44, an unlatch coil 45, a set of normally closed contacts 46, and two sets of normally open contacts 47 and 48. Relay 43 is of a well-known type in which the armature remains in either a normal or latch position or a second or unlatch position until drawn from that position by temporary energization of the appropriate coil. The valve solenoids 28, 29 and 37 and relay 43 are supplied with actuating current from a line 49 through a transformer 50 and a master switch 51. The valve solenoid 28 is connected in series with a normally-open starting switch 52 and the supply transformer 50, the switch 52 serving as a starting switch whereby an operator may initiate the automatically controlled operating cycle of the apparatus. A normally open trip switch 53, which is actuated by a one-way tripping bar 54 connected to the transverse member 32, is connected in parallel with switch 52 through contacts 46 of relay 43. The latch coil 44 of relay 43 is connected in parallel with valve solenoid 28 so that upon energization of that solenoid by operation of switch 52, the relay 43 is placed in a latch position closing contacts 46 and connecting switch 53 to control the operation of valve solenoid 28. Valve solenoid 29 is connected in series with contacts 48 of relay 43 and transformer 50, while valve solenoid 37 of the cylinder 35 is similarly connected in series with the contacts 47. The latch coil 45 of relay 43 is connected in series with a normally open stop switch 55 and transformer 50 and is controlled by switch 55 to close contacts 47 and 48 and open contacts 46.

The stop switch 55 is actuated by a trip rod 56 which is supported by a portion of the frame 57 of the cylinder 19 and by the transverse member 32. The rod 56 slides in an opening 58 in the transverse member 32 which moves along the rod during the spindle advance portion of the cycle to engage a stop nut 59 at the end of the traverse of the piston 20, that is upon the completion of an operation upon a work piece. The rod 56 includes a handle 60 for control by an operator.

The torque sensing circuit 42 initiates the automatic control action of the control circuit 41 by closing the circuit including the valve solenoid 29 and transformer 50 in response to increases of motor line current of greater than predetermined magnitude. The circuit 42 includes a current transformer 65, of known type, serially connected between the motor 14 and supply line 49. The voltage output at the secondary of the transformer 65 is thus a function of the current drawn by the motor 14. The secondary of the transformer 65 is connected to the input terminals 66 of a bridge rectifier 67 which converts the alternating voltage at the secondary into rectified alternating voltage at the output terminals 68 of the rectifier. A capacitor 69 connected across the output terminals 68 smooths the rectified voltage into direct voltage, while a variable resistor 70 determines the voltage at the output of the rectifier for any given primary current in the transformer.

Changes in the magnitude of the direct voltage across the bridge output terminals 68 determine the operation of two relays 71 and 72. Relay 71 includes a solenoid 73, a set of normally closed contacts 74 and a set of normally open contacts 75, while relay 72 includes a solenoid 76 and a set of normally open contacts 77, both relays being adapted to operate on impulses or impulsive changes of relatively short duration. The relays are connected in cascade, relay 71 being controlled by the operation of relay 72, in order to achieve positive responses to voltage variations of predetermined magnitude. Thus, solenoid 76 of relay 72 is connected through normally closed contacts 74 of relay 71 and in parallel with resistor 78, which acts as a voltage divider in conjunction with resistor 79. Solenoid 73 of relay 71 is connected through the normally open contacts 77 of relay 72 to conductors 80 and 81 so as to be responsive to the direct voltage appearing across the rectifier output terminals 68 and the capacitor 69. Finally, the normally open contacts 75 are serially connected with transformer 50 and solenoid valve 29 through conductors 82.

In order to control the response times of the relays, capacitors 83 and 84 are connected across the solenoids 73 and 76 of relays 71 and 72, respectively. These capacitors, together with the solenoids and the resistors 78 and 79 form circuits whose response to transient changes in the voltage delivered by the rectifier 67 is determined by the relative magnitude of the circuit constants of those elements. The factors affecting such transients are well known in the electrical arts and the circuits may be designed to respond at any desired rate. Thus the amount of change in motor torque and the rate of response to that torque on the part of the relays 71 and 72 may be determined by selection of circuit constants appropriate to the application.

In operation, the torque sensing circuit is adjusted for a particular operation by adjustment of the resistor 70. Any change in motor torque will result in a change in current flow through the primary of transformer 65 with the production of a corresponding voltage across the transformer secondary and at the output terminals 68 of the rectifier 67. The voltage at terminals 68 results in a current flow through resistors 78 and 79, normally closed contacts 74 of relay 71 and solenoid 76 of relay 72. If the impulse of current is of sufficient intensity and duration, relay 72 will be actuated to close contacts 77.

Closure of contacts 77 connects solenoid 73 to conductors 80 and 81, so that if the voltage at terminals 68 has continued and produces a current impulse of sufficient amplitude and duration in the solenoid 73, relay 71 is actuated to open contacts 74 and close contacts 75. Opening of contacts 74 causes the deactuation of relay 72 so that contacts 77 return to their normally open position. Closure of contacts 75 closes the circuit of conductors 82, thus connecting solenoid 29 to the transformer 50.

Inasmuch as relay 72 is deactuated by the opening of contacts 74, relay 71 is deactuated by the opening of contacts 77. Accordingly, capacitor 83 must be chosen so that relay 71 is actuated for a sufficient length of time by the discharge of the capacitor into solenoid 73 to permit operation of the valve associated with solenoid 29. The opening of relay 72 is, of course, similarly delayed by the discharge of capacitor 84.

Considering now the operation of the entire apparatus of the invention, controlled operation of the drill press 10 is initiated by closure of the switch 52. Closure of switch 52 energizes solenoid controlled valve 28 which is thereby moved to admit compressed air to the cylinder 19 through conduit 26, to drive piston 20 to the right. As piston 20 moves to the right, spindle 11 is advanced toward the work 15 at a rate determined by the air pressure, cross sectional area of the piston, etc. until the transverse member 32 engages the stop nut 34. The spindle then continues to advance at a second or feed rate determined by the dashpot 30, the position of the nut 34 on the rod member 31 normally being such as to correspond with the engagement of the drill 17 with the work piece 15. The feed rate may be adjusted by suitable control of the dashpot resistance through a control knob 85.

Closure of the switch 52 energizes the latch coil 44 of relay 43, thus moving the armature 86 of the relay into the reset position and closing contacts 46 to connect switch 53 for control of the solenoid 28. Thus, the spindle is advanced at the feed rate until such time as the torque exerted by the motor 14 becomes excessive. The torque sensing circuit 42 then closes the circuit including solenoid 29, connecting the conduit 27 to the compressed air inlet 24 and conduit 26 to the exhaust 25. Thereupon, the piston 20 is driven to the left and drill 11 is withdrawn from the work, the stop nut 34 remaining in a position corresponding to the extent of the work performed by the drill, shown in dotted outline 87. Piston 20 continues to move to the left until the swinging link 54 engages the lever of switch 53 to close the switch. Thereupon solenoid 28 is again energized and piston 20 is driven to the right, advancing the spindle rapidly until the transverse member 32 engages the stop nut 34 at position 87, whereupon the advance continues at the feed rate under control of dashpot 30.

The above-described process continues automatically; retraction and advance being made so often as the torque exerted by the motor exceeds the amount predetermined by resistor 70. At the completion of the operation, transverse member 32 engages stop nut 59, which is properly positioned upon rod member 56, and switch 55 is closed. Closure of switch 55 energizes unlatch coil 45 of relay 43 closing contacts 47 and 48 and opening contacts 46. Closure of contacts 48 energizes solenoid 29, thus causing piston 20 to be driven to the left. The opening of contacts 46 disables the switch 53 so that piston 20 is not again driven to the right by reason of the engagement of the swinging link 54 with the lever of the switch 53. Closure of contacts 47 energizes solenoid 37 which connects the compressed air inlet to conduit 39 thus causing piston 36 to move to the left and returning the dashpot to its initial position. The apparatus is thus returned to its initial operating position and in condition for the commencement of a new operating cycle.

Referring now to Fig. 2, there is shown an embodiment of the invention incorporating features alternative to those of Fig. 1. Specifically, there is shown a drill press 100 powered by an air turbine comprising a turbine wheel 101 secured to the spindle 11, and a nozzle 102 positioned sufficiently close to turbine wheel 101 to cause a back pressure to be developed in conduit 107 under conditions hereinafter explained. The alternative features of the invention are concerned with torque sensing means appropriate to the air turbine, while the remaining components, particularly the control apparatus 18 and control circuits 41, are similar to those of the embodiment of Fig. 1 and are numbered to correspond with those components.

The nozzle 102 is supplied with compressed air through conduits 103 and 104 connected to conduits 26 and 27, respectively. Conduits 103 and 104 include one way or check valves 105 and 106 and are connected to the nozzle 102 through a common conduit 107 and a venturi tube 108. The venturi tube 108 serves as a metering device and has the inlet throat thereof connected to a bellows 109. The diaphragm of the bellows actuates a normally open switch 110 which is serially connected in the circuit formed by solenoid 29 and transformer 50. Apparatus of this type suitable for this particular purpose is illustrated and described in Instruments and Process Control, page 32, Delmar Publishers Inc., Albany, N. Y. (1945).

In operation, the feed control apparatus 18 functions as in the embodiment of Fig. 1. The function of the torque sensing circuit 42 of that apparatus in the energization of the retract solenoid 29 is, however, performed by the bellows 109 and the switch 110. Thus, during the spindle advance portion of the operating cycle, wherein advance solenoid 28 is energized by switches 52 or 53, compressed air from the conduit 26 passes through conduit 103, check valve 105, conduit 107 and venturi tube 108 and nozzle 102 to drive the turbine wheel 101 and spindle 11. During normal working operation of the spindle 11 and drill 17, the back pressure at the venturi tube is such that the bellows is essentially unaffected thereby. As the drive torque rises however, the back pressure rises; and, when a predetermined magnitude is exceeded, bellows 109 expands sufficiently to close switch 110. Closure of switch 110 completes the circuit including solenoid 29 and transformer 50 to energize the solenoid and connect conduit 27 to air intake 24. Piston 20 is then driven to the left, retracting the spindle from the working position.

Compressed air flows from conduit 27 through conduit 104, and check valve 106 to conduit 107 and nozzle 102 to rotate the spindle during the retract portion of the cycle. This rotation assists in clearing the work piece and drill of any burrs, or chips, which might tend to cause clogging.

It is to be understood that the representation of the invention as embodied in apparatus for the control of a drill press is illustrative only. Thus, the apparatus of this invention may be equally well utilized for the control of apparatus such as lathes, milling machines, tapping machines and the like, and the invention itself is not to be considered as limited in this respect. It is to be understood that the specific terminology utilized in other respects is not intended to be restrictive or confining and that various rearrangements of parts and modifications of detail may be resorted to without departing from the scope or spirit of the invention as herein claimed.

What is claimed is:

1. In a machine tool, a tool holder, drive means for rotating said holder adapted to be connected to a source of electric current, means for reciprocating the spindle in advance and retract strokes comprising a first pneumatic actuator including a cylinder, a piston operatively connected to the spindle, conduits communicating with said cylinder at each end thereof, and valve means including control solenoids in each of said conduits adapted to admit compressed air into the cylinder at either side of the piston or allow the exhaust thereof, a dashpot operatively connected to said holder and said pneumatic cylinder by a one-way slide mechanism so as to be effective during the advance stroke, a second pneumatic actuator including a cylinder, a piston connected to said dashpot for returning the dashpot to an initial operating position corresponding to the commencement of an advance stroke, and valve means including a control solenoid adapted to admit compressed air into the cylinder or allow the exhaust thereof, electrical means connected to said solenoids for controlling the said actuators to cycle the spindle through retract and advance strokes comprising load responsive means connected to the drive means and to one solenoid for retracting the tool holder upon an increase in drive torque, a trip switch and actuating means operatively connected to the first actuator for operating the switch when the holder has been retracted to a predetermined position, and connections between the trip switch and the remaining solenoid of the first actuator.

2. In a machine tool, a tool holder, electric drive means comprising an electric motor for rotating said holder adapted to be connected to a source of electric current, means for reciprocating the spindle in advance and retract strokes comprising a first pneumatic actuator including a cylinder, a piston operatively connected to the spindle, conduits communicating with said cylinder at each end thereof, and valve means including control solenoids in each of said conduits and adapted to admit compressed air into the cylinder at either side of the piston when the solenoids are energized and allow the exhaust thereof when deenergized, a dashpot operatively connected to said holder and said piston by a one-way mechanism so as to be effective during the advance stroke, a second pneumatic actuator including a cylinder, a piston connected to said dashpot for returning the dashpot to an initial operating position corresponding to the commencement of an advance stroke, and valve means including a control solenoid adapted to admit compressed air into the cylinder or allow the exhaust thereof, electrical means connected to said actuators for controlling the said cylinders to cycle the spindle through retract and advance strokes including current responsive means connected in series with the said electric motor and to one solenoid for retracting the tool holder upon an increase in drive torque, a trip switch and actuating means operatively connected to the first actuator for operating the switch when the holder has been retracted to a predetermined position, and connections between the trip switch and the remaining solenoid of the first actuator.

3. The invention in accordance with claim 2, said current responsive means comprising a current transformer, a rectifier, and a relay operated thereby.

4. In a machine tool, a rotating tool holder carrying a tool, electrical drive means for said spindle including a motor adapted to be connected to a source of electric current, means for advancing and retracting said spindle along the axis of rotation thereof comprising a pneumatic actuator including a cylinder and a piston, a linearly acting member attached to said piston, means operatively connected between said member and said spindle for transforming movement of the piston into movement of the spindle, a second pneumatic actuator including a cylinder and a piston, a second linearly acting member connected to said second piston, a dashpot connected to the second member, link means connecting said two members comprising a transverse member secured to one of the members and sliding freely along the remaining member, and stop means secured to the said remaining member whereby the dashpot constrains the motion of the said one member only during the spindle advancing motion, the second cylinder serving to return the dashpot to its initial position at the completion of the holder advancing motion, electrical means for controlling the action of said actuators comprising valve means each including a solenoid for admitting compressed air to the cylinder when the solenoid is energized and exhausting the cylinder when the solenoid is deenergized, an advance solenoid and a retract solenoid for the first actuator, and a return solenoid for the second actuator, current responsive means connected in series with the drive motor and to the retract solenoid for energizing that solenoid to retract the tool holder upon an increase in drive torque, a trip switch and actuating means on the transverse member for operating the switch when the holder has been retracted to a predetermined position and connections between the trip switch and the advance solenoid of the first actuator, and means for returning the tool holder and dashpot to a starting position when the tool holder has been advanced through a predetermined feed including a stop switch, actuating means for the stop switch adapted to be engaged by the transverse member and electric circuit means connected to the switch and to the said return solenoid and the said retract solenoid for energizing those solenoids when the switch is operated.

5. The invention in accordance with claim 4, said current responsive means comprising a current transformer, a rectifier, and a relay connected to the rectifier and to the said retract solenoid.

6. The invention in accordance with claim 4, said current responsive means comprising a current transformer, a rectifier, first and second relays connected in cascade across the rectifier, and condensors shunted across the solenoids of the relays for delaying the response of the relays to changes of current in the drive motor.

7. In a machine tool, a tool holder, means for rotating the tool holder comprising an air turbine including a nozzle, means for reciprocating the holder in advance and retract strokes comprising a first pneumatic actuator including a cylinder, a piston, air conduits communicating with said cylinder, and valve means in each of said conduits adapted to admit compressed air into the cylinder at each side of the piston or allow the exhaust thereof, a dashpot operatively connected to said holder and said cylinder by a one-way link so as to be effective only during the advance stroke, a second pneumatic actuator including a cylinder, a piston connected to said dashpot for returning the dashpot to an initial operating position corresponding to the commencement of the advance stroke and valve means associated with the second cylinder for admitting or exhausting compressed air, means connected to said valve means for controlling the said cylinders to cycle the holder through retract and advance strokes from a given work position and torque responsive means connected to said control means and said nozzle for initiating the action of said control means.

8. In a machine tool, a tool holder, means for rotating the tool holder comprising an air turbine including a nozzle, means for reciprocating the holder in advance and retract strokes comprising a first pneumatic actuator including a cylinder, a piston, air conduits communicating with said cylinder, and valve means in each of said conduits adapted to admit compressed air into the cylinder at each side of the piston or allow the exhaust thereof, a dashpot associated with said holder in said cylinder, the dashpot being operatively connected thereto by a one-way mechanism so as to be effective during only a portion of the advance stroke, a second pneumatic actuator including a cylinder, a piston connected to said dashpot for returning the dashpot to an initial operating position corresponding to the commencement of the advance stroke and valve means associated with the second cylinder for admitting or exhausting compressed air, a solenoid for each of the valve means, electrical means connected to said valve means for controlling the said cylinders to cycle the holder through retract and advance strokes from a given work position, and torque responsive means connected to said control means and said nozzle for initiating the action of said control means, said torque responsive means comprising a venturi tube connected to the nozzle, a bellows communicating with the throat of said venturi tube and a switch operated by said bellows and electrical connections from the switch to the said solenoids.

9. A step feed for a drilling machine comprising, in combination, means for reciprocating a machine tool element in advance and retract strokes comprising a first pneumatic actuator including a cylinder, a piston adapted to be connected to the element, conduits communicating with said cylinder at either end thereof, and valve means including control solenoids in each of said conduits and adapted to admit compressed air into the cylinder at each side of the piston or allow the exhaust thereof, a dashpot associated with said spindle and said hydraulic cylinder, the dashpot being operatively connected thereto by a one-way mechanism so as to be effective during only a portion of the feed stroke, a second pneumatic actuator including a cylinder, a piston connected to said dashpot for returning the dashpot to an initial operating position corresponding to the commencement of an advance stroke, and valve means including a control solenoid adapted to admit compressed air into the cylinder or allow the exhaust thereof, electrical means connected to said valve solenoids for controlling the said cylinders to cycle the spindle through return and feed strokes from a given work position including a retract stroke control and an advance stroke control, the cycle being completed automatically when once started, and torque responsive means comprising electric circuit means adapted to be connected to an electric drive motor for the machine tool and to said control means for initiating the action of said control means in response to an increase in motor current of greater than a predetermined amount.

10. A step feed for a machine tool having a tool holder and an electric drive motor comprising a pneumatic tool actuator for reciprocating the tool holder, a linearly moving member on the actuator and a transverse member attached thereto, a dashpot, a pneumatic dashpot actuator and a linearly moving member connecting the dashpot and the dashpot actuator traversed by the said transverse member, and a stop nut on the said connecting member adapted to be engaged by the transverse member, a first valve means for the tool actuator and a first solenoid for opening the first valve means, a second valve means for the tool actuator and a second solenoid for opening the second valve means, a third valve means for the dashpot actuator and a third solenoid for opening the third valve means each when the respective solenoid is energized, means for energizing the first solenoid to advance the tool holder including a start switch, means for energizing the second solenoid to retract the tool holder when the motor current increases beyond a certain amount including a current transformer and a relay, means for again energizing the first solenoid to again advance the tool holder when the tool holder has been retracted a certain distance including a trip switch and a dog on the transverse member, and means for energizing the second and third solenoids to return the apparatus to a starting position including a stop switch and a stop member adapted to be engaged by the transverse member, and a latch relay connected to the stop switch and the said second and third solenoids.

11. The invention in accordance with claim 10, the said last-named means comprising a latch relay having an unlatch coil thereof connected to the stop switch, a pair of normally open contacts connected to the second solenoid, a pair of normally open contacts connected to the third solenoid, and a pair of normally closed contacts connected to the trip switch for disabling the trip switch.

12. The invention in accordance with claim 10, the said means for energizing the second solenoid including a rectifier connected to the said current transformer, a first relay with a solenoid and a pair of normally open contacts, a second relay with a solenoid and a pair of normally closed contacts, and a second pair of contacts, a series circuit across the output of the rectifier including the normally closed contacts of the second relay and the solenoid of the first relay, and a condensor across the solenoid of the first relay and a series circuit across the output of the rectifier including the normally open contacts of the first relay and the solenoid of the second relay, and a condensor across the solenoid of the second relay and connections from the said second pair of contacts to the second solenoid.

13. An electrical drive and control apparatus which comprises in combination an electric motor having an energizing circuit therefor, a current transformer with the primary coil thereof connected in series with the energizing circuit of the motor, a rectifier connected to the secondary coil of the transformer, a first relay with a solenoid and a pair of normally open contacts, a second relay with a solenoid and a pair of normally closed contacts, and a second pair of contacts, a series circuit across the output of the rectifier including a voltage divider, the normally closed contacts of the second relay and the solenoid of the first relay, and a capacitor across the solenoid of the first relay, a series circuit across the output of the rectifier including the normally open contacts of the first relay and the solenoid of the second relay, a capacitor across the solenoid of the second relay, and a circuit connected to the second contacts of the second relay for controlling the drive motor in response to a current change in the motor of greater than a predetermined duration.

14. Apparatus for controlling a step drilling device comprising a rotatable drilling tool, a motor operatively associated with the tool to rotate it, means associated with the motor and the tool and operative to advance and retract said tool while the motor is rotating the tool, said means comprising a piston reciprocable in a first cylinder, a first valve communicating with the cylinder to admit fluid into said cylinder on one side of said piston, a first solenoid to control said first valve, a second valve communicating with the cylinder to admit fluid into said cylinder on the other side of said piston, a second solenoid to control said second valve, a piston reciprocable in a second cylinder, a third valve communicating with the second cylinder on one side of the piston to control the flow of fluid into and out of said second cylinder on one side of said piston, a third solenoid to control said third valve, a latching relay having first, second and third sets of contacts, a first series circuit including a first transformer and said first solenoid, manually operable means for closing said first series circuit, and further means including the first set of contacts of said relay for automatically closing said first circuit when said tool is being retracted, a second series circuit including said second solenoid, the second set of contacts of said latching relay and said first transformer, and a third series circuit including the third set of contacts of said latching relay, said third solenoid and said first transformer, means operatively associated with the tool advancing means for automatically actuating said relay to close said second and third series circuits to energize said second and third solenoids when the tool has reached the end of its advancing stroke, further automatic means operatively associated with the tool retracting means and operative to retract said tool when the drive torque exceeds a predetermined amount, said further automatic means including said tool rotating motor, a second transformer having a primary winding in series with the motor, and a circuit connected to the secondary of said second transformer and including a relay operable to energize said second solenoid when the current in said second transformer exceeds a predetermined amount for a predetermined interval of time.

15. Apparatus for controlling a step drilling device comprising a rotatable drilling tool, a motor operatively associated with the tool to rotate it, means associated with the motor and the tool and operative to advance and retract said tool while the motor is rotating the tool, said means comprising a piston reciprocable in a first cylinder, a first valve communicating with the cylinder to admit fluid into said cylinder on one side of said piston, a first solenoid to control said first valve, a second valve communicating with the cylinder to admit fluid into said cylinder on the other side of said piston, a second solenoid to control said second valve, a piston reciprocable in a second cylinder, a third valve communicating with the second cylinder on one side of the piston to control the flow of fluid into and out of said second cylinder on one side of said piston, a third solenoid to control said third valve, a latching relay, a first series circuit including a first transformer and said first solenoid, manually operable means for closing said first series circuit and further means including said latching relay for automatically closing said first circuit when said tool is being retracted, a second series circuit including said second solenoid, said latching relay and said first transformer, and a third series circuit including said latching relay, said third solenoid and said first transformer, means operatively associated with the tool advancing means for automatically actuating said relay to close said second and third series circuit to effect energization of said second and third solenoids when the tool has reached the end of its advancing stroke, further automatic means operatively associated with the tool retracting means and operative to retract said tool when the drive torque exceeds a predetermined amount, said further automatic means including said tool rotating motor, a second transformer having a primary winding in series with the motor, and a circuit connected to the secondary of said second transformer and including a relay operable to energize said second solenoid when the current in said second transformer exceeds a predetermined amount for a predetermined interval of time.

References Cited in the file of this patent

UNITED STATES PATENTS

| | | |
|---|---|---|
| 1,871,499 | Crago | Aug. 16, 1932 |
| 1,911,138 | Clute et al. | May 23, 1933 |
| 1,920,979 | Fraser | Aug. 8, 1933 |
| 1,998,873 | Kingsbury | Apr. 23, 1935 |
| 2,079,640 | Vickers et al. | May 11, 1937 |
| 2,210,691 | Stephenson | Aug. 6, 1940 |
| 2,381,375 | Warrington | Aug. 7, 1945 |
| 2,396,422 | Hines | Mar. 12, 1946 |
| 2,491,983 | King et al. | Dec. 20, 1949 |